Aug. 30, 1960 — R. DE STEFANI — 2,950,701
BOAT WITH TWO SPACED HULLS
Filed Sept. 11, 1957 — 2 Sheets-Sheet 1
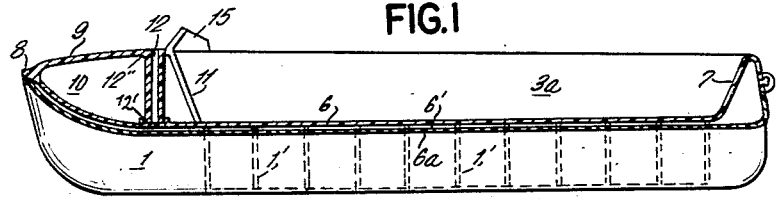
FIG.1
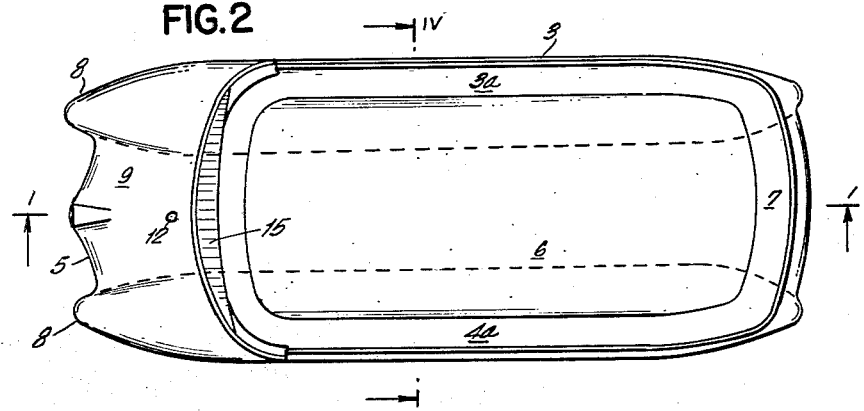
FIG.2
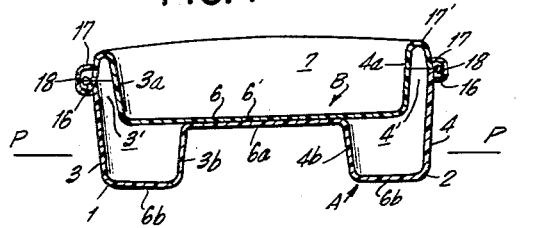
FIG.4
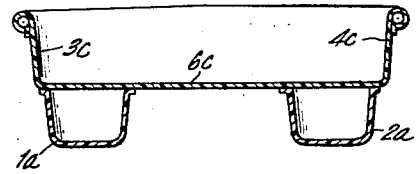
FIG.5
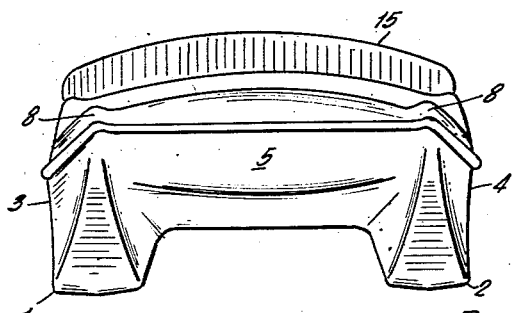
FIG.3
INVENTOR.
ROMOLO DE STEFANI
BY 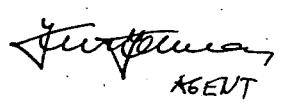
AGENT Aug. 30, 1960  R. DE STEFANI  2,950,701
BOAT WITH TWO SPACED HULLS
Filed Sept. 11, 1957  2 Sheets-Sheet 2

INVENTOR.
ROMOLO DE STEFANI
BY
AGENT

United States Patent Office 2,950,701
Patented Aug. 30, 1960

2,950,701
BOAT WITH TWO SPACED HULLS

Romolo De Stefani, Milan, Italy, assignor to Soc. per Az. Fabbrica Motocicli e Velocipedi Edoardo Bianchi, Abruzzi, Milan, Italy, a corporation of Italy Filed Sept. 11, 1957, Ser. No. 683,370

Claims priority, application Italy Sept. 18, 1956

13 Claims. (Cl. 115—41)

The present invention relates to boats with twin float runners or so-called catamarans.

As is known, the float runners of such boats may consist of one or more water-tight, hollow compartments which may or may not be filled with substantially solid buoyant material, such as cork, foam plastics, including expanded polystyrene or polyesters, and the like. The float runners are joined by a center frame which is normally above the water line.

It is a principal object of this invention to provide a boat of this type which consists of integral superposed shells which may be simply joined and are so shaped that the shells form the float runners and an open passenger room with side walls. Preferably, only two shells are used to form the entire boat.

It is also an object of the invention to provide a non-sinkable boat of this type whose shells may be so shaped as to form a fore- and/or aft-deck.

It is another object to provide a water-tight engine compartment in said shells, wherein a motor and related propelling unit for the boat may be mounted.

A further object of the invention is to give the upper portion of the boat the shape of a parallelepipedon, which makes it more readily storable and transportable.

The above and many other objects of the present invention are accomplished by providing a boat with an integral upper hull shell comprising two like side walls and a bottom wall interconnecting the side walls, the bottom and side walls defining a water-tight, open room for the accommodation of a passenger or passengers, and at least one lower hull shell joined to the upper hull shell and defining twin float runners. Preferably, there is provided a single lower hull shell comprising two long side walls spaced from and complementary to the side walls of the upper hull shell, the two lower hull shell side walls extending below the bottom wall of the upper hull shell, two short side walls spaced inwardly from said long side walls, two webs interconnecting each pair of long and short side walls at their bottoms, each long side wall, short side wall and interconnecting web defining a float runner, and a flat bottom wall interconnecting the upper ends of the short side walls and spaced from the bottom wall of the upper hull shell. At their upper ends, the complementary side walls of the upper and lower hull shells are provided with marginal edges to facilitate the joining of the two shells into a unitary boat structure.

In accordance with one feature of the invention, the flat bottom of the upper hull shell is upwardly cambered astern and at the bow. The cambered bow section may have integrally connected thereto a backwardly extending, substantially horizontal fore-deck portion.

According to a preferred embodiment, the hull shells are made of a light, buoyant sheet material, such as expanded plastics, cork or the like, covered by a mechanically resistant material, such as wood, sheet metal, polyester plastic, plastic laminates and the like, to provide the required rigidity without necessarily acting as water-tight elements.

If it is desired to provide power propulsion, the upper and lower hull shells are preferably so shaped as to define at a suitable location therebetween a water-tight engine compartment adapted to receive a motor and a propelling unit. Preferred motor and propeller arrangements are also within the scope of this invention.

The above and other objects, features and advantages of the invention will be more fully set forth in connection with certain preferred embodiments thereof, taken in conjunction with the accompanying drawing wherein:

Fig. 1 is a longitudinal section of one embodiment of the boat, taken along line I—I of Fig. 2;

Fig. 2 is a top view of the boat of Fig. 1;

Fig. 3 is a front elevation of the bow of the boat of Figs. 1 and 2;

Fig. 4 is a transverse section of the boat, taken along line IV—IV of Fig. 2;

Fig. 5 is a transverse section similar to Fig. 4 of another embodiment;

Figure 6:
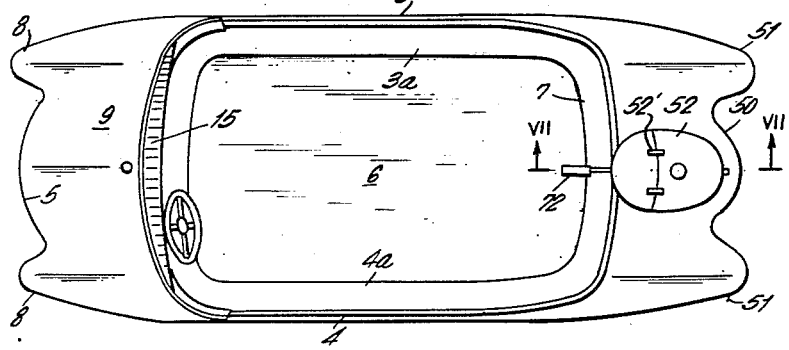
Fig. 6 is a top view of a motor boat constructed according to yet another embodiment of the invention.

Referring now to the drawing and more particularly to the boat illustrated in Figs. 1 to 4, there is shown a catamaran comprising twin float runners 1 and 2 extending longitudinally of the boat and being parallel to each other. As illustrated most clearly in Fig. 4, the entire boat is a double-walled structure formed by two integral hull shells A and B. Lower hull shell A consists of the long side walls 3 and 4, short side walls 3b and 4b, and horizontal interconnecting webs 6a and 6b, connecting the short side walls and each associated short and long side wall, respectively. The elements 3, 3b, 6b and 4, 4b, 6b form the twin float runners 1 and 2.

Upper hull shell B consists of side walls 3a and 4a and an interconnecting bottom wall 6, the side walls 3a and 4a being complementary to and spaced from the upwardly extending portions of the side walls 3 and 4. The bottom wall 6 is spaced from web 6a so that the two hull shells form a double-walled structure. The lower and upper hull shells have marginal flanges 16 and 17, respectively, to enable the shells to be fixed together, for instance by welding, sealing or by mechanical means, such as rivets, stitching and other suitable connections. If desired, the seam between flanges 16 and 17 may be protected by a molding 18 made preferably of a resilient material and acting as a swifter.

As is well known in the art, the float runners or pontoons 1 and 2 may define a single hollow water-tight chamber or they may be sub-divided by bulkheads 1' into a plurality of water-tight cells or compartments. Alternatively, the float runners may be filled with light, buoyant materials, such as foam plastics, cork and the like. The interspaces 3' between side walls 3 and 3a, 4' between side walls 4 and 4a, and 6' between bottoms 6 and 6a may similarly define a single, hollow, water-tight chamber or a plurality of water-tight cells. They, too, may alternatively be filled with buoyant materials.

As best shown in Figs. 1 and 2, the bottom wall 6 of the upper hull shell is cambered at its ends to form the bow portion 5 and the stern portion 7 which, together with the side walls 3a and 4a, define the open passenger space of the boat. The center portion of the bottom wall is substantially flat to provide maximum utilization of the passenger space. The bow camber 5 bends upwardly and joins the side walls at forward end 8 whence it is bent backwardly to form the foredeck 9. Bow camber 5 and foredeck 9 define a hollow forepeak 10 communicating with the passenger space through an opening which may be closed by door 11. A vertical sleeve 12 is mounted in the forepeak, held in position by flanged bearings 12' and 12" in camber 5 and deck 9, respectively, and serving to hold a mast.

With the boat under normal load, the bottom 6, 6a and the bow and stern cambers are spaced a given distance from the water line P—P (see Fig. 4), this distance being determined by the buoyancy of the float runners. In this manner, the boat may be navigated without the bottom continuously contacting the water. This will produce an air-stream between the twin float runners and the boat bottom. At higher operating speeds, such an air stream will give the boat an aerodynamic lift and will add to the buoyancy of the float runners. On the other hand, in case of overloading, the boat bottom will be in continuous contact with the water, thereby greatly increasing the displacement of the boat and permitting it to carry substantial overloads.

Under normal loads, only the float runners will be submerged in the water, thus assuring high speed navigation with relatively low power output because the float runners have a low drag in the water, having a high ratio of longitudinal to transverse dimensions. As is known, with all other factors being equal, the resistance offered to the movement of a body in a fluid is decreased in direct proportion to the increase in the ratio between the body's longitudinal and transverse dimensions, i.e. the slimmer the body the lower the resistance. This result is accomplished in accordance with the invention despite the fact that the upper portion or the passenger space of the boat is substantially rectangular and thus produces maximum accommodations for passengers and/or cargo.

In view of the double-walled structure of the entire boat, the craft is non-sinkable, continued floating of the boat even after heavy damage being further assured if the interspace between the walls of the boat is subdivided into water-tight compartments and/or is filled with buoyant material. Thus, even if the float runners were completely flooded with water, the hollow bottom 6' and the hollow sides 3' and 4' of the passenger space could still float and the boat could be navigated. Emergency navigation could be continued even if the boat capsized, in which case the hollow sides would, in effect, become the hull of the boat. The buoyancy of the boat is increased further if the hull shells A and B are themselves made of a light, buoyant sheet material.

Since all longitudinal and transverse structures of the boat are constituted by double walls, no further reinforcing means is required to give the boat the needed rigidity. Also, since the bow as well as the stern of the boat consists of normally floating, transverse, hollow structures, the boat has a high transverse stability and strong resistance to capsizing, even if built very small and light. Thus, a swimmer may grip the side of the boat and heave himself aboard without causing the boat to capsize, the upper edges 17' of the sides being preferably so dimensioned and shaped so as to permit easy gripping.

A windshield 15 may be mounted on the inner edge of foredeck 9, as shown in Figs. 1 to 3.

Fig. 5 schematically illustrates another embodiment of a catamaran built in accordance with the invention. This boat comprises an integral upper hull shell consisting of a flat bottom 6c having bow and stern cambers similar to the bottom 6 of the embodiment illustrated in Fig. 1 and side walls 3c and 4c, this upper hull shell defining the passenger space. Secured to the underside of bottom 6c are two longitudinal lower hull shells 1a and 2a constituting the float runners of the boat. If desired, these float runners may again be sub-divided into a plurality of water-tight compartments or they may contain solid buoyant material. Since this boat has no double walls, its buoyancy under emergency conditions will be lower than that of the first-described embodiment.

The boat shown in Fig. 6 is generally similar to that of Fig. 2, except that the upper and lower hull shells are extended at the stern beyond camber 7 to form a central extension 50 and two side extensions 51 substantially in line with the float runners, said extensions together with camber 7 defining a water-tight engine compartment in the stern of the boat. The engine compartment is open on top and may be water-tightly closed by hinged cover or door 52.

Figure 7:
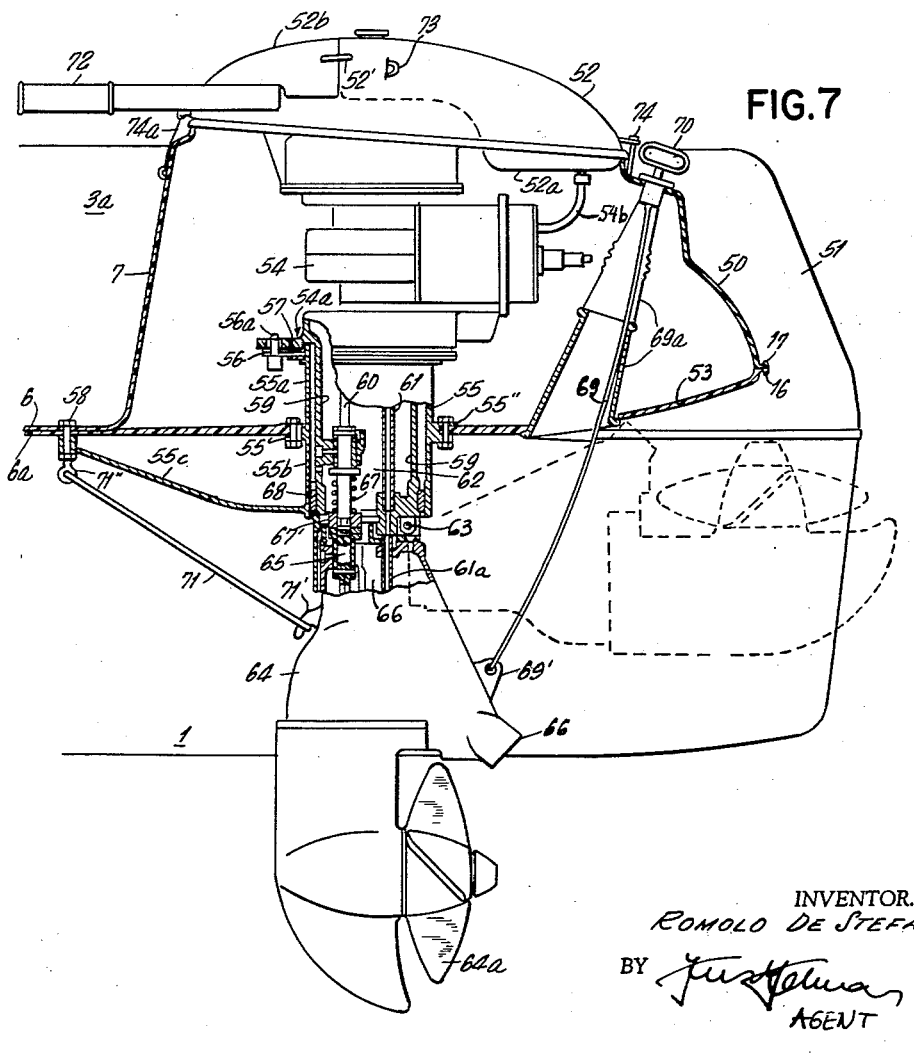
Fig. 7 is a longitudinal section of the stern of the boat of Fig. 6, taken along line VII—VII and illustrating the motor and propeller unit.

Fig. 7 illustrates, on an enlarged scale, the mounting of the motor and the propeller unit in the engine compartment as well as the details of the power means. As will be seen in this figure, the bottom webs 6 and 6a of the upper and lower hull shells are fixed to each other to interconnect the shells, rather than defining an interspace therebetween, as in the embodiment of Fig. 1. The lower hull shell web 6a has a rearwardly extending bottom wall 53 while the upper hull shell has the end wall 50 extending from stern camber 7. Extensions 50 and 53 are fixed together along marginal edges 16 and 17, as also shown in Fig. 4. The end wall 50 has an opening which is covered by pivotally mounted door 52, a motor 54 being mounted in the compartment defined by walls 50, 53 and 7.

The bottom wall extension 53 of the engine compartment has a circular opening serving as a bearing for cylindrical housing 55. The housing is water-tightly mounted in the circular opening, for instance by illustrated bolts 55' carrying gaskets 55" to assure a water-tight fit. An upper portion 55a of the cylindrical housing extends into the engine compartment while a lower housing portion 55b extends therebelow. Upper housing portion 55a carries rotary support plate 56 supporting the base flange 54a of the motor 54. The motor may be swivelled on its support by the pin 56a interconnecting plate 56 and flange 54a, a rubber gasket 57 being interposed between the plate and the flange to assure resilient support of the motor.

The lower housing portion 55b carries thrust arm 55c whose end is secured to the boat bottom by bolt 58. Motor 54 has a sleeve 59 extending into and through housing 55, sleeve 59 being threaded into housing 55. The transmission shaft 60, the cooling water intake duct 61 and the discharge duct 62 are carried by bearings integral with or supported by the interior wall of sleeve 59.

The propelling unit 64 is pivoted to the sleeve 59 by lug 63 which is carried by the sleeve. In this manner, the entire propeller unit may be swung about pivot 63 from its vertical or operating position, shown in full lines in Fig. 7, to a horizontal position, shown therein in broken lines. A transmission shaft 65, a cooling water intake duct 61a and a discharge duct 66 are carried by bearings integral with or supported by the interior wall of the propeller unit, the latter shaft and ducts being aligned and coaxial with the corresponding elements in sleeve 59 when the propeller unit is in its operating position. An axial clutch 67' couples transmission shafts 60 and 65 together when the propeller unit is in its vertical position, a dampening spring 67 being provided to absorb shock. Similarly, the ducts 61, 61a and 62, 66, respectively, are in alignment and communication when the propeller unit is in its operating position. In this manner, power from the motor 54 is transmitted to the propeller 64a. An annular packing 68, of rubber or like resilient material, is mounted between sleeve 59 and housing 55. This packing serves to cushion the thrust transmitted from the rotating propeller to the housing 55 and simultaneously assures a water-tight mounting of the sleeve 59 in the housing while permitting the engine with the propeller unit to be rotated about their vertical axis.

The means for swinging the propelling unit upwardly into its inoperative position, when the duct connections are interrupted and the transmission shafts are uncoupled, will now be described.

As shown, a wire or rod 69 is attached at one end to lug 69' on the propeller unit 64. A water-tight passageway 69a which may consist of a rigid and a flexible sleeve portion, as shown, is mounted in orifices in the bottom wall extension 53 and end wall 50, respectively, to permit the longitudinal element 69 to be passed therethrough. Handle 70 is attached to the other end of wire 69 and may be gripped from inboard. If the wire is pulled upwardly by handle 70, the propeller unit is pivoted out of its operating position and it may be held in an inoperative position by attaching the handle 70 to hook 73 on cover 52. However, before being able to pivot the propeller unit by pulling on longitudinal element 69, the tierod 71 must be disengaged from hook 71' mounted on the propeller unit diametrically opposite to lug 69'. The tie rod is linked to the bottom by means of lug 71". When the tierod is secured to hook 71', it holds the propeller unit in its operating or vertical position, a tight fit being assured by the tensile strength of the tierod.

As illustrated in Fig. 7, the pivotal door or cover 52 preferably is hollow to constitute a fuel tank 52a connected to the motor 54 by fuel line 54b. The fuel tank is connected to the rear portion 52b of the cover which is pivoted on the hull of the boat and may be swung upwardly and rearwardly to permit the motor to be started. The door portion 52b has an orifice allowing the passage of tiller 72. The entire cover 52, 52b is held on the end wall 50 of the hull by a resilient tierod 74a held in position by hook 74. When the tierod is removed, the cover may easily be taken off.

Steering of the boat is effected simply by turning the motor and propeller unit around its vertical axis in housing 55 by means of tiller 72 or other suitable means, such as tierods actuated by a steering wheel.

It will be obvious from the above description that the motor and propeller unit mounting permits the two to be rotated about a vertical axis together when the propeller unit is in its operating or vertical position while the propelling unit may be pivoted out of the vertical into an inoperative position. Also, the motor may be readily taken out of the engine compartment when the door 52 is tilted back and/or removed and the sleeve 59 is screwed out of housing 55. The threaded connection between sleeve 59 and housing 55 makes ready turning of the motor possible while the packing 68 assures a water-tight seal so as to maintain the imperviousness of the engine compartment.

The thrust produced by the rotating propeller 64a tends to maintain the propeller unit in its vertical position and is transmitted to the boat by the housing 55 and its thrust arm 55c which is attached to the boat, rubber packing 68 assuring not only water tightness of the engine compartment but also acting as a vibration absorber preventing the vibrations of the motor from being transmitted to the boat.

The pivot pin mounting the propeller unit in lug 63 is preferably readily removable so that the entire propeller unit may be detached from the boat. Since, as above described, the motor may also be readily lifted from the engine compartment, the entire power drive may be removed from the boat without any difficulty.

The advantages of this arrangement include the following:

(1) The motor is mounted in a water-tight compartment and may be kept running even when part of the boat is flooded.

(2) The center of gravity is lowered and the length of the transmission shaft is reduced.

(3) The propeller unit may be readily disconnected, thereby reducing the overall size of the boat and making its transportation and storage easier.

(4) The motor is concealed and shielded, thus keeping it out of sight and minimizing the noise created during its operation.

(5) The point of thrust generation is brought nearer the point of thrust application.

(6) The propeller unit is positively protected in its upper or inoperative position.

The hollow structure of the entire boat makes it possible readily to accommodate in the double walls the steering means, such as ropes, rods, wires and the like, connecting the steering wheel in the bow to the motor and propeller. In this manner, the steering means are kept out of sight and also protected.

Since the upper hull of the boat preferably has the shape of a parallelepipedon, it is unusually stable out of water and may, therefore, be very easily set afloat and brought to shore. It can also be easily transported, for instance on the roof of a car; many boats may be stored side by side with a minimum waste of space or they may be stacked up without requiring special supports.

The hull shells constituting the boat of the present invention may be readily molded from plastics, such as polyesters, thus producing a boat of low cost, very light weight and high resistance to impact.

What I claim is:

1. A boat comprising an integral lower hull shell having two long side walls, two short side walls spaced inwardly from said long side walls, a web interconnecting each pair of long and short side walls at their bottom, and a flat bottom wall interconnecting the upper ends of the short side walls, the pairs of long and short side walls forming twin float runners with the respective interconnecting webs; an integral upper hull shell having two side walls and a bottom wall interconnecting the side walls, the side and bottom walls of the upper shell defining a water-tight, open room for the accommodation of at least one passenger and being complementary to the long side walls and bottom wall of the lower hull shell; and means for joining the upper ends of the upper hull shell side walls and the long side walls of the lower hull shell.

2. The boat of claim 1, wherein the complementary side and bottom walls of the upper and lower hull shells are spaced from each other to form double walls.

3. The boat of claim 1, wherein said bottom wall of the upper hull shell has cambered sections astern and at the bow.

4. The boat of claim 3, wherein the cambered section at the bow extends rearwardly to form a short deck.

5. The boat of claim 1, wherein the hull shells are of polyester plastic.

6. A boat comprising an integral lower hull shell having two long side walls, two short side walls spaced inwardly from the long side walls, a web interconnecting eah pair of long and short side walls at the bottom, and a flat bottom wall interconnecting the upper ends of the short side walls, the pairs of long and short side walls forming twin float runners with the respective interconnecting webs; an integral upper hull shell having two side walls and a bottom wall interconnecting the side walls, the latter bottom wall having cambered sections astern and at the bow, the side and bottom walls of the upper shell defining a water-tight, open room for the accommodation of at least one passenger, the bottom walls of the upper and lower hull shells being adjacent one another, portions of the long side walls of the lower hull shell extending above the bottom walls and being complementary to the side walls and cambered sections of the upper hull shell, said long side wall portions being spaced from the complementary side walls and cambered sections of the upper hull shell and defining therebetween at least one compartment adapted to hold a motor; a motor in said compartment; and means for joining the upper ends of the upper hull shell side walls and the long side walls of the lower hull shell.

7. The boat of claim 6, comprising means water-tightly mounted in said compartment and extending downwardly therefrom for supporting the motor in the compartment for rotation about a vertical axis, a boat propelling means pivotally connected to the downward extension of the motor supporting means, the propelling means being pivotal about a horizontal axis, tie means attached to the boat for holding the propelling means in a vertical position, power transmission means between the motor and the propelling means, said power transmission means being in alignment and operatively coupled when the propelling means is held in said vertical position, a thrust transmitting means mounted between the downward extension of motor support means and the boat; and a water-tight cover for an opening in the top of said compartment.

8. The boat of claim 7, wherein said cover is hollow and defines an interior chamber serving as a fuel tank.

9. The boat of claim 6, comprising a cylindrical housing water-tightly mounted in the bottom of the motor compartment and extending outwardly therefrom, an annular rotary support plate mounted on said housing in the compartment, a threaded sleeve connected to said motor and threadedly mounted in said housing for rotation therein, a flange connected to said sleeve and arranged adjacent said support plate, and resilient means interposed between said flange and said support plate.

10. The boat of claim 7, wherein the pivot axis of the propelling means lies behind the vertical axis of the motor, the propelling means is detachably connected to the downward extension of the motor supporting means and the tie means is detachable from the propelling means.

11. The boat of claim 6, comprising means for vertically supporting the motor in said compartment, said means having a downward extension outside of said compartment, a propelling unit, means for mounting said propelling unit on said downward extension for pivotal movement about a horizontal axis from a vertical position in alignment with said downward extension to an upper, substantially horizontal position, power transmission means connected to said motor and to said propelling unit, respectively, and extending through said motor supporting means, the power transmission means of the motor and the propelling unit being in alignment when the propeller unit is in vertical position, and flexible clutch means coupling the aligned power transmission means.

12. The boat of claim 11, wherein said clutch means includes a resilient shock dampener.

13. The boat of claim 6, comprising a propelling unit, means for pivotally connecting the propelling unit to said motor outside of said compartment, said compartment being between the twin float runners and the propelling unit being pivotal about a horizontal axis from a vertical into a substantially horizontal position between the float runners, resilient means for holding said propelling unit in said vertical position, said resilient means including an elastic tie rod connected to said boat and detachably connectable to said propelling unit, and an elongated element connected to said propelling unit and actuatable from inboard for pulling said propelling unit into said horizontal position.

References Cited in the file of this patent

UNITED STATES PATENTS

| | | |
|---|---|---|
| 1,591,341 | Stiles | July 6, 1926 |
| 1,718,764 | Sochurek | June 25, 1929 |
| 1,855,076 | Warner | Apr. 19, 1932 |
| 1,874,988 | Harvey | Aug. 30, 1932 |
| 2,091,264 | Berry | Aug. 13, 1937 |
| 2,417,508 | Leyde | Mar. 18, 1947 |
| 2,666,406 | Babcock | Jan. 19, 1954 |
| 2,815,309 | Ganahl et al. | Dec. 3, 1957 |
| 2,815,517 | Andresen | Dec. 10, 1957 |
| 2,869,149 | O'Bannon | Jan. 20, 1959 |

FOREIGN PATENTS

| | | |
|---|---|---|
| 508,162 | Canada | Dec. 14, 1954 |